Patented June 27, 1939

2,164,269

UNITED STATES PATENT OFFICE 2,164,269

ADHESIVE AND METHOD OF MAKING THE SAME

William Dawes Fawthrop, Seattle, Wash., assignor to I. F. Laucks, Inc., Seattle, Wash., a corporation of Washington No Drawing. Application October 14, 1933, Serial No. 693,578

4 Claims. (Cl. 134—23.1)

This invention relates to methods of manufacturing water resistant glues and adhesives from fish meal and the like, and the product.

The general object of this invention is to provide a relatively simple and novel process for the manufacture of water resistant glues and adhesives from fish residue, or fish meal from which a large part of the oil content has been removed.

These and many other objects as will appear from the following disclosure are successfully attained by means of this invention.

This invention resides substantially in the steps, series of steps and the product resulting therefrom, all as will appear more fully hereinafter.

Heretofore it has been common practice to make glues and the like from casein, oil seed residue, blood albumin and the like by suitable chemical treatment thereof. It is likewise common practice to produce glues and adhesives from the hides, bones and sinews of animals.

All of these glues have been treated to make them water resistant for use in the veneer, and ply-wood industries. It is likewise common practice to manufacture starch glues which are not water resistant, but which find considerable use in the furniture and wood working industry. Fish glues are also known, usually in liquid form, and prepared from the gelatinous parts of fish, but they are expensive and are not water resistant.

An important object of this invention is to produce an inexpensive, efficient glue, or adhesive from the protein bearing parts of fish which may be made water resistant as will be disclosed below.

In accordance with this invention, highly resistant water glues are produced by chemically processing from fish residues after the oil has been largely, and, if desired, completely removed therefrom. The base for the glue is prepared from fish in the following manner which is given merely in illustrative sense. In the case of herring, pilchard and dog fish, the entire body of the fish may be employed. In the case of salmon and halibut, and other fish, the waste parts and offal are employed. In either case, the fish substance is boiled to remove, as far as possible, the oil content thereof. The product of boiling is then dried and coarsely ground, resulting in fish meal containing from 50% to 70%, or more protein with varying amounts of oil, bone, fibre and moisture in accordance with the particular method of treatment employed. The above treatment of the fish substance by itself, forms no part of this invention since any fish meal, or material from which a large part, or, substantially all of the oil has been removed, may be employed. Fish meal of this nature is readily obtained on the open market and is suitable for processing in accordance with the following description to produce a water resistant adhesive. Fish meal constitutes the cheapest possible source of protein available on the market and suitable for the manufacture of adhesives in accordance with this invention. It is likewise available in large quantities, being at present primarily prepared as a fertilizer and for feeding purposes.

Fish meal obtained from any available source and having little or no oil content is reduced if necessary by grinding or its equivalent so that it will pass at least through a 30 mesh. Higher grade glue may be prepared by grinding and bolting meal so that it will pass through a 100 mesh or more, resulting in a higher percentage of protein content. By this refinement the bone and fibre are largely removed. However, with a view to producing an inexpensive glue, the whole meal ground to pass through a 30 mesh, is desirable.

The fish meal thus prepared is first treated in an alkali aqueous medium to effect complete dispersion of the protein content and saponification of whatever oil there is present in the meal. While in accordance with this invention, dispersion and saponification may be carried out in cold water, it is a rather slow procedure and requires a longer period of treatment than is desirable where large quantities of glue are to be prepared.

It is preferable therefor, in accordance with this invention, to treat the fish meal with an alkali in a hot aqueous medium for a sufficient period of time with agitation to cause complete dispersion of the protein and saponification of the oil. The resulting adhesive product has great strength. It is homogeneous in character and may be varied as desired in viscosity by varying the amount of alkali and water present during the treatment. This heat treatment may be carried out in any suitable form of steam or hot water jacketed mixer or agitator. As soon as dispersion is complete the heat supply is shut off and cold water is turned on to cool the glue, so as not to cause too rapid hydrolysis.

The glue thus produced while available for many uses, is not particularly water resistant. In accordance with this invention therefore, it is treated with any one of various metallic salts in solution, or mixtures thereof in solution with continued agitation until a thickening of the mixture is observed. This thickening is apparently the result of chemical union of the protein and metallic salts to form probably protein metallic compounds and metallic soap compounds. Hydrated lime is then added in admixture with water to the mass with further agitation and a sufficient quantity of water to reduce the final mixture of adhesive material to the desired consistency. The hydrated lime combines with the remainder of the alkaline protein and saponified oil which may not have been completely reduced to a metallic salt. The glue is then complete requiring about twenty minutes for preparation and is homogenous, non-tacky, and of the proper fluidity. It does not gel on standing and has a glue life of several hours.

The glue thus produced is not a hot glue when used, as would be the case if a minimum amount of water is used so as to give the highest percentage of alkali to react on the meal in the initial period. After initial heat treatment, the water and water solutions which are added, are cold so that the resulting glue is a cool or cold glue which may be applied cold.

The best and cheapset alkali to use in the initial step to bring about dispersion, is caustic soda, although caustic potash can be used within the scope of this invention. The alkali apparently breaks down the cell structures releasing the oil and protein for ready reaction therewith.

Many forms of metallic salts may be employed, as for example, salts of zinc, aluminum, chromium, magnesium, lead, and the like, as well as admixtures thereof. Zinc chloride has been found highly practical and desirable. Metallic salts, such as zinc chloride is preferable, but not necessarily employed in a 50% solution. The sulphates, as well as the chlorides of metal, may be employed.

In addition to hydrated lime, other water proofing agents may be used, such as tannins, phenol, latex, resin, gums, hexamethylene, formaldehyde with ammonia, paraformaldehyde, urea, sodium, alginate, waterproofing oils, and the like, either singly or in admixture.

The amount of caustic soda per hundred pounds of fish meal varies if any other alkali is used in addition. However, if used alone, practical results are secured if, from 6 to 15 pounds of caustic soda is employed per 100 pounds of fish meal. A 50% zinc chloride solution is used in the amount of from 1 to 5 pounds for the above quantities. From 8 to 15 pounds of hydrated lime is employed in solution with approximately twice as much water. Silicate of soda may be added to further cheapen them for special purposes. In addition, the fish oil smell may be checked by the use of suitable deodorizers, if desired. In special circumstances, casein, blood albumen, starch and the like may be employed, singly, or in admixture with the fish meal to make modified adhesive within the scope of this invention.

Several specific examples will now be given to illustrate the above description.

Approximately 275 pounds of water at 160° F. are placed in a mixer or agitator which is then started; 100 pounds of 30 mesh fish meal are then added to the water; 12 pounds of caustic soda dissolved in 25 pounds of water are then added to the mixture. This mixture is then subjected to mixing and agitation and heating for five to ten minutes until the fish meal is completely broken down into dispersed form and the oil content, if there be any, is saponified. The heat supply is then shut off and 5 pounds of zinc chloride, 50% solution, mixed in 20 pounds of water, is added. The entire mixture is then agitated for approximately 3 minutes; 10 pounds of hydrated lime in 20 pounds of water, is then added, and the entire mass mixed for approximately 5 minutes; from 75 to 100 pounds of cold water are finally added and mixed for 2 minutes. The glue is then ready for use.

In the second example, the procedure is the same. In this case, however, 97 pounds of fish meal are employed in a mixture with 3 pounds of sodium fluoride; 10 pounds of caustic soda are employed in a mixture with 20 pounds of water; 4 pounds of 50% zinc chloride solution are employed in a mixture with 20 pounds of water; 10 pounds of hydrated lime in a mixture with 20 pounds of water are then added. Finally, 50 to 75 pounds of cold water are added.

It is to be noted that even if all of the oil is extracted from the fish meal before treatment, in accordance with this invention, a good water resistant adhesive is produced. The fish meal may therefore be produced, specially for use with all, or only a part of the oil removed, or the fish meal may be procured as a commercial product on the open market. Since it is the protein content of the fish meal which is the base of the adhesive of this invention, it would be within the scope of the invention to use the protein content fish meal which may be readily extracted therefrom as a substitute for the entire meal. In other words, the protein content of the fish meal to be extracted and employed as the base of the adhesive and be treated in accordance with the above described process.

From the above description it will be apparent that this invention may be varied by those skilled in the art in many ways without departure therefrom. The quantities of materials, the specific ingredients for treating the fish meal and the periods of treatment may readily be varied, without departure from the scope of this invention.

I do not, therefore, desire to be strictly limited to the disclosure given for purposes of illustration, but rather to the scope of the pending claims.

What I desire to secure by United States Letters Patent is:

1. A process of making a glue, which comprises softening dry fish meal into a liquidly spreadable glue by subjecting the fish meal to the action of hot water, adding an alkali, agitating, adding zinc chloride, agitating, adding hydrated lime, agitating, and adding cold water to desired consistency.

2. A process of making a glue, which comprises softening dry fish meal into a liquidly spreadable glue by subjecting the fish meal to the action of a hot alkaline solution, adding zinc chloride, then adding lime, and finally adding cold water to desired consistency.

3. A process of making a glue, which comprises softening dry fish meal into a liquidly spreadable glue by subjecting the fish meal to the action of a hot alkaline solution, adding a metallic salt reactive on the protein and then adding an agent increasing the water-resistance, and finally cooling.

4. A fish glue comprising a fish meal softened from dry state into a liquidly spreadable glue, and containing metal compounds in combination and being water-insoluble if dried.

WILLIAM DAWES FAWTHROP.